US008983187B2

(12) United States Patent
Cheng

(10) Patent No.: US 8,983,187 B2
(45) Date of Patent: Mar. 17, 2015

(54) SYSTEMS AND METHODS FOR PERFORMING EDGE ENHANCEMENT IN DIGITAL IMAGES

(71) Applicant: Cyberlink Corp., Shindian, Taipei (TW)

(72) Inventor: Chih-Yu Cheng, Taipei City (TW)

(73) Assignee: Cyberlink Corp., Shindian, Taipei (TW)

( * ) Notice: Subject to any disclaimer, the term of this patent is extended or adjusted under 35 U.S.C. 154(b) by 113 days.

(21) Appl. No.: 13/788,789

(22) Filed: Mar. 7, 2013

(65) Prior Publication Data
US 2014/0254930 A1 Sep. 11, 2014

(51) Int. Cl.
G06K 9/00 (2006.01)
G06T 5/00 (2006.01)

(52) U.S. Cl.
CPC .................................. G06T 5/00 (2013.01)
USPC ............................................... 382/167

(58) Field of Classification Search
None
See application file for complete search history.

(56) References Cited

U.S. PATENT DOCUMENTS

| 6,611,627 | B1* | 8/2003 | LaRossa et al. | 382/240 |
| 6,667,815 | B1* | 12/2003 | Nagao | 358/1.9 |
| 2009/0161983 | A1* | 6/2009 | Ciurea | 382/275 |
| 2010/0002952 | A1* | 1/2010 | Oizumi et al. | 382/266 |
| 2010/0183222 | A1* | 7/2010 | Fattal | 382/166 |
| 2010/0208141 | A1* | 8/2010 | Kim | 348/649 |
| 2010/0329581 | A1* | 12/2010 | Yamazaki | 382/254 |
| 2011/0229029 | A1 | 9/2011 | Kass | |

OTHER PUBLICATIONS

Seetzen et al. "High Dynamic Range Display Systems" Apr. 23, 2004.
Fattal et al. "Gradient Domain High Dynamic Range Compression" School of Computer Science and Engineering, The Hebrew School of Jerusalem, 2001.
Hedaoo et al. "Wavelet Thresholding Approach for Image Denoising" International Journal of Network Security & Its Applications (IJNSA), vol. 3, No. 4, Jul. 2011.

* cited by examiner

Primary Examiner — Aaron W Carter
Assistant Examiner — Ian Lemieux
(74) Attorney, Agent, or Firm — McClure, Qualey & Rodack, LLP

(57) ABSTRACT

A system for editing a digital image comprises a low pass filter for receiving a source image and for filtering high spatial frequency components of the source image to generate a smoothed image. An arithmetic operator unit subtracts color values of the smoothed image from color values of the source image to produce a first image value on pixel-by-pixel basis. A gradient reversal analyzer compares gradient values of the smoothed image to gradient values of the source image and generates a control signal. A boost controller generates a new value for each pixel of a boost parameter map according to the control signal. The boost controller applies the boost parameter map to modify the first image value to generate a second image value. The arithmetic operator unit is further configured to generate an edge enhanced image according to color values of the source image and the second image value.

26 Claims, 6 Drawing Sheets

SYSTEMS AND METHODS FOR PERFORMING EDGE ENHANCEMENT IN DIGITAL IMAGES

BACKGROUND

Over the years, digital content has gained increasing popularity with consumers. With the ever-growing amount of digital content available to consumers through the Internet using computers, smart phones, and other sources, consumers have access to a vast amount of content. Furthermore, many devices and services are readily available that allow consumers to capture and generate digital images. Unsharp masking is an image processing technique commonly applied to digital images for performing edge enhancement of objects. However, one side effect of this technique is that a halo effect and other artifacts may be created in the image upon application of a linear filter such as a Gaussian filter for smoothing out the image during the unsharp masking operation.

SUMMARY

Briefly described, one embodiment, among others, is a method for performing edge enhancement on a source image in an image editing device, where the method comprises applying a smoothing filter to the source image to generate a smoothed image wherein each pixel of the source image and each pixel of the smoothed image has a corresponding color value and gradient value. The method further comprises subtracting color values of at least one pixel of the smoothed image from color values of at least one pixel of the source image to derive at least one first image value, comparing a gradient value of at least one pixel of the smoothed image to a gradient value of the corresponding pixel of the source image to derive a gradient reversal measurement for at least one pixel, and obtaining a boost parameter map comprising an initial value for each pixel. The method further comprises generating a new value for each pixel of the boost parameter map according to the gradient reversal measurement and the initial value of each pixel of the boost parameter map, applying a boost function according to the boost parameter map to modify the at least one first image value to generate at least one second image value, and generating a final edge enhanced image according to the color values of the source image and according to the at least one second image value.

Another embodiment is a system for editing a digital image. The system comprises a low pass filter configured to receive a source image and filter high spatial frequency components of the source image to generate a smoothed image, an arithmetic operator unit configured to subtract color values of the smoothed image from color values of the source image to produce a first image value on pixel-by-pixel basis, and a gradient reversal analyzer configured to compare gradient values of the smoothed image to gradient values of the source image and generate a control signal. The system further comprises a boost controller configured to generate a new value for each pixel of a boost parameter map according to the control signal, wherein the boost controller is further configured to apply the boost parameter map to modify the first image value to generate a second image value. The arithmetic operator unit is further configured to generate an edge enhanced image according to color values of the source image and the second image value Another embodiment is a non-transitory computer-readable medium embodying a program executable in a computing device. The program comprises code that removes high spatial frequency components from the source image to generate a smoothed image, code that derives a first image value based on the smoothed image and the source image, and code that compares gradient values of the smoothed image to gradient values of the source image. The program further comprises code that generates a new value for each pixel of a boost parameter map according to the comparison of gradient values and an initial value of each pixel of the boost parameter map, code that applies a boost function according to the boost parameter map to modify the first image value to generate a second image value, and code that adds the second image value to color values of the source image to generate a final edge enhanced image.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The operation of unsharp masking involves processing a blurred digital image to generate an unsharp mask of the original image. In general, the sharpening process based the unsharp masking technique begins with utilizing a slightly blurred version of the original image. This blurred version is then subtracted away from the original version of the image to detect the presence of edges to create an unsharp mask, which is effectively used as a high-pass filter. Contrast levels are then selectively increased along these edges using this unsharp mask.

The unsharp masking creates the illusion that the resulting image has a greater level of sharpness than the original image. In the context of signal processing, an unsharp mask is generally a linear or nonlinear filter that amplifies high-frequency components. However, as described above, one side effect of this technique is that a halo effect in addition to other artifacts may be created around objects upon application of a linear filter such as a Gaussian filter for smoothing out the image during the unsharp masking operation.

Figure 5A:
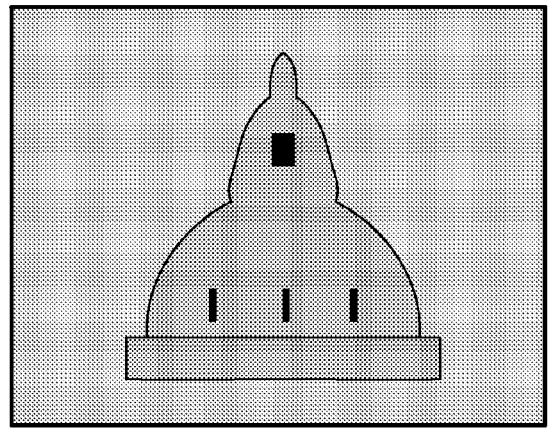
FIG. 5A depicts a digital image prior to undergoing edge enhancement.
Figure 5B:
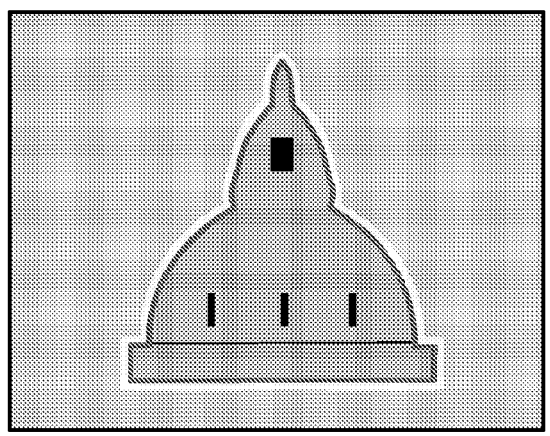
FIG. 5B shows the digital image in FIG. 5A after undergoing tone and edge enhancement utilizing a linear filter based method.
Figure 5C:
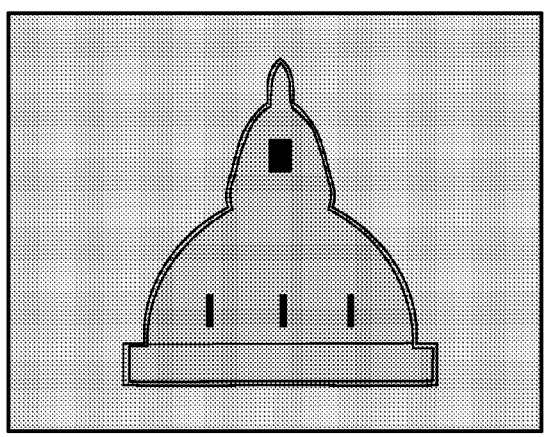
FIG. 5C illustrates an example of artifacts due to gradient reversal, particularly around the high contrast edges of objects.

To illustrate, reference is made to FIG. 5A, which depicts a digital image prior to undergoing edge enhancement. FIG. 5B shows the digital image after undergoing tone and edge enhancement utilizing a conventional linear filter based method. As shown, a halo effect appears around the high contrast regions of the various objects. In conventional systems, edge adaptive based filters are commonly applied in an attempt to alleviate the artifacts. The various techniques utilized by conventional systems, including bilateral filter based techniques, may help mitigate the halo effect. However, other side effects typically appear as a result. Such side effects include an artifact, particularly around the high contrast edges of objects, as illustrated in FIG. 5C, which shows an excessive tone mapping effect appearing around objects with extreme luminance variations.

Various embodiments are disclosed for improving the quality of edge enhancement in digital images. For some embodiments, a gradient reversal analyzer is implemented that determines whether the gradient value is larger in a low pass smoothed version of the image than the gradient value in the original image prior to undergoing low pass filtering. Various embodiments further include a boost controller configured to new value for each pixel of a detail boost parameter map on a pixel-by-pixel basis according to the corresponding gradient reversal result determined by the gradient reversal analyzer. The boost parameter map is a base value used to control the boost strength of an edge boost function applied to an image during an edge enhancement process. Based on the comparison of gradient values corresponding to the filter image and the source image, the boost controller may be configured to attenuate the boost ratio to alleviate the artifacts in the final digital image.

In this regard, one embodiment, among others, is a method for performing edge enhancement on a source image in an image editing device, where the method comprises applying a smoothing filter to the source image to generate a smoothed image wherein each pixel of the source image and each pixel of the smoothed image has a corresponding color value and gradient value. The method further comprises subtracting color values of at least one pixel of the smoothed image from color values of at least one pixel of the source image to derive at least one first image value, comparing a gradient value of at least one pixel of the smoothed image to a gradient value of the corresponding pixel of the source image to derive a gradient reversal measurement for at least one pixel, and obtaining a boost parameter map comprising an initial value for each pixel.

The method further comprises generating a new value for each pixel of the boost parameter map according to the gradient reversal measurement and the initial value of each pixel of the boost parameter map. A boost function is applied according to the boost parameter map to modify the at least one first image value to generate at least one second image value, and a final edge enhanced image is generated according to the color values of the source image and according to the at least one second image value.

Figure 1A:
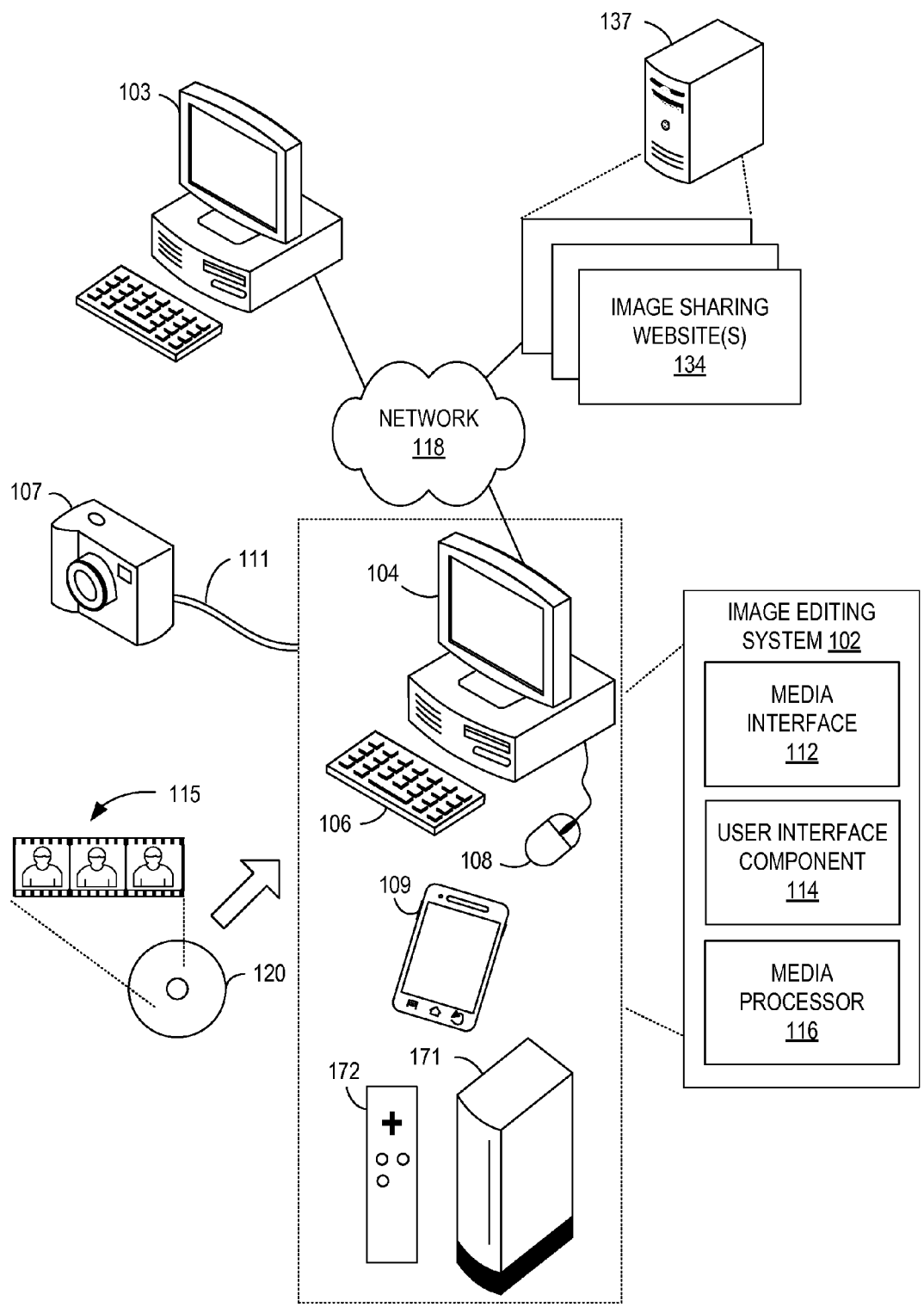
FIG. 1A is a block diagram of an image editing system for facilitating edge enhancement via adaptive generation of a new value for each pixel of a boost parameter map in accordance with various embodiments of the present disclosure.

A description of a system for facilitating edge enhancement through adaptive generation of a new value for each pixel of a boost parameter map is now described followed by a discussion of the operation of the components within the system. FIG. 1A is a block diagram of an image editing system 102 in which embodiments of the edge enhancement techniques disclosed herein may be implemented. The image editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the image editing system 102 is embodied as a smartphone 109 or tablet, the user may interface with the image editing system 102 via a touchscreen interface (not shown). In other embodiments, the image editing system 102 may be embodied as a video gaming console 171, which includes a video game controller 172 for receiving user preferences. For such embodiments, the video gaming console 171 may be connected to a television (not shown) or other display 104.

The image editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the image editing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

As depicted in FIG. 1A, the media interface 112 in the image editing system 102 may also be configured to retrieve digital media content 115 directly from a digital camera 107 where a cable 111 or some other interface may be used for coupling the digital camera 107 to the image editing system 102. The image editing system 102 may support any one of a number of common computer interfaces, such as, but not limited to IEEE-1394 High Performance Serial Bus (Firewire), USB, a serial connection, and a parallel connection.

The digital camera 107 may also be coupled to the image editing system 102 over a wireless connection or other communication path. The image editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image editing system 102 may receive digital media content 115 from another computing system 103. Alternatively, the image editing system 102 may access one or more image sharing websites 134 hosted on a server 137 via the network 118 to retrieve digital media content 115.

The user interface component 114 in the image editing system 102 is configured to generate a user interface for obtaining one or more settings for a boost parameter map for purposes of performing edge enhancement on a digital image, where the boost parameter map obtained from a user of the image editing system 102 serves as an initial value. A new value for each pixel of the boost parameter map is generated according to the gradient reversal measurement and the initial value of each pixel of the boost parameter map.

Figure 1B:
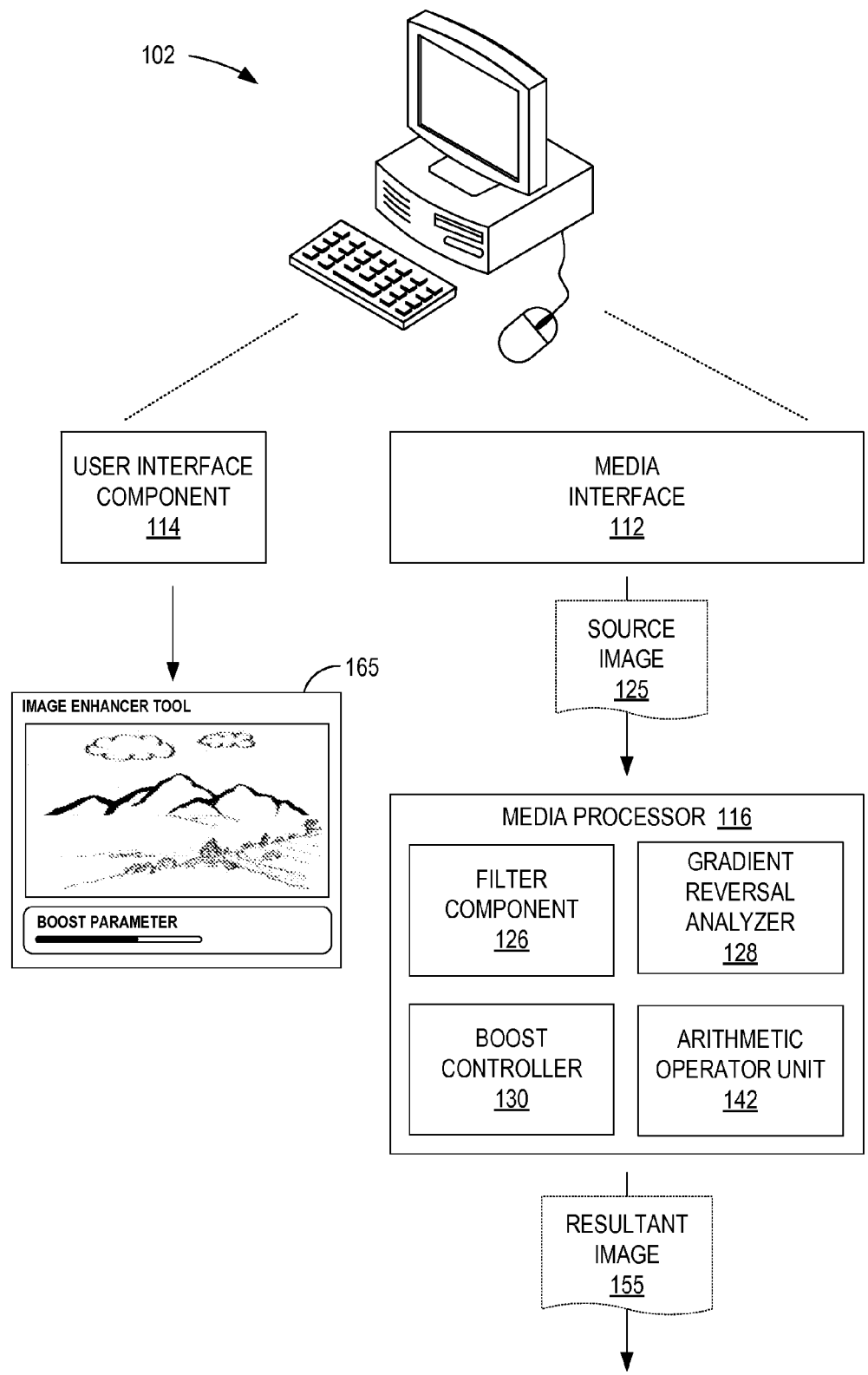
FIG. 1B illustrates various components of the media processor in the image editing system of FIG. 1A in accordance with various embodiments of the present disclosure.

The media processor 116 is configured to apply the boost parameter map specified by the user to perform edge enhancement. Reference is made to FIG. 1B, which illustrates various components of the media processor 116 in FIG. 1A. As shown, the media processor 116 further comprises a filter component 126, a gradient reversal analyzer 128, a boost controller 130, and an arithmetic operator unit 142.

The filter component 126 in the media processor 116 is configured to receive a source image 125 and filter high spatial frequency components from the source image 125 to generate a smoothed image. The filter component 126 may be embodied, for example, as any kind of edge preserving filter such as a bilateral filter, a median filter, and so on, where the filter component 126 performs the functions of reducing noise while preserving edges within the image. The gradient reversal analyzer 128 is configured to compare a gradient value of the smoothed image generated by the filter component 126 to a gradient value of the source image 125 and generate a control signal.

In general, the gradient reversal analyzer 128 determines whether the gradient value of the smoothed image is greater than or less than the gradient value of the original source image 125. For some embodiments, the gradient reversal analyzer 128 may perform the comparison of gradient reversal values on a pixel-by-pixel basis. Note that the gradient value of the smoothed image and that of the source image is determined by subtracting color values of neighboring pixels.

The arithmetic operator unit 142 is configured to perform arithmetic and logical operations. While the arithmetic operator unit 142 may be utilized to perform more complex operations, the arithmetic operator unit 142 is utilized by the media processor 116 to perform such arithmetic operations as subtraction, multiplication, addition, and so on during the edge enhancement process, as described in more detail below.

The boost controller 130 is configured to generate a new value for each pixel of the boost parameter map according to the gradient reversal measurement by the gradient reversal analyzer 128 and the initial value of each pixel of the boost parameter map. In particular, the gradient reversal measurement is derived by comparing a gradient value of the smoothed image to a gradient value of the source image. The initial value of each pixel of the boost parameter map may be specified by the user, where the initial value is obtained via a user interface 165 rendered for display by the user interface component 114, as shown in FIG. 1B. For some embodiments, the boost controller 130 is configured to a new value for the boost parameter map according to a relationship between respective gradient values in the smoothed image output by the filter component 126 and the source image 125.

The boost controller 130 may be further configured to generate a new value for each pixel of the boost parameter map according to the gradient reversal measurement and the initial value of each pixel of the boost parameter map by reducing values of the boost parameter map to a fraction of the initial value in response to the gradient value of the smoothed image being larger than the gradient reversal value of the source image 125. As described in more detail below, the boost controller 130 may be further configured to apply a boost function according to the boost parameter map to modify a first image to generate a second image. A resultant image (i.e., the final edge enhanced image) 155 is then generated according to the source image 125 and the second image.

Figure 2:
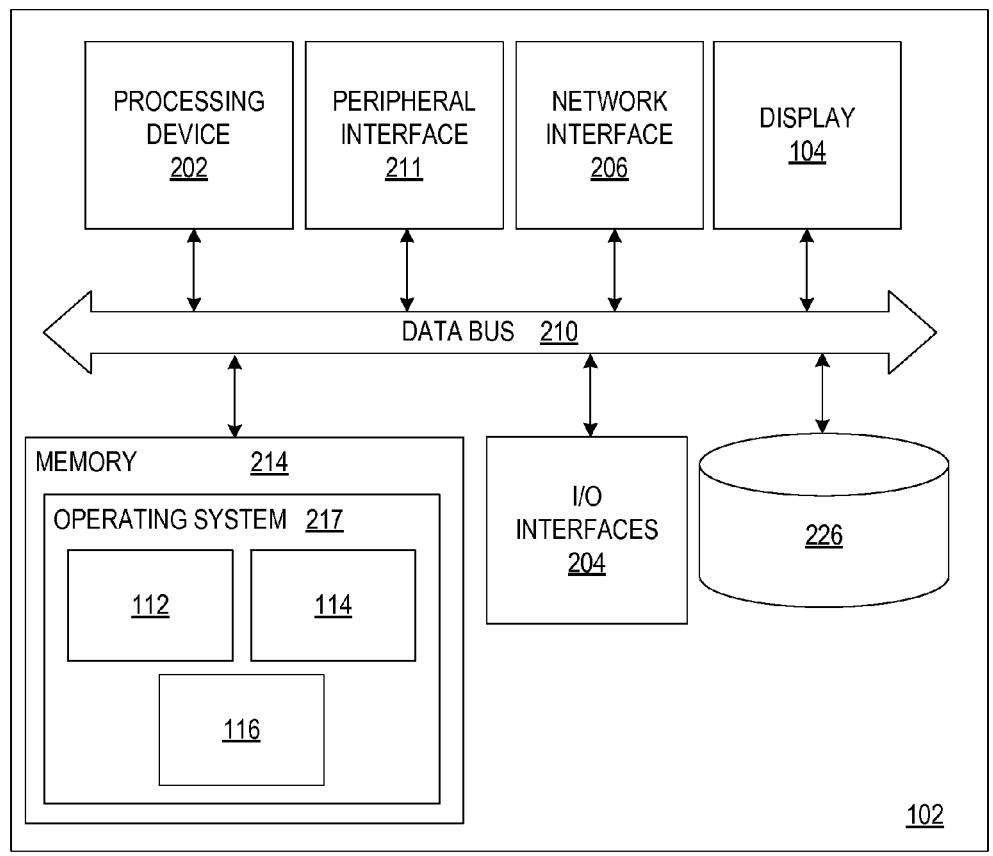
FIG. 2 is a detailed view of the image editing system device of FIG. 1A in accordance with various embodiments of the present disclosure.

FIG. 2 is a schematic diagram of the image editing system 102 shown in FIG. 1A. The image editing system 102 may be embodied in any one of a wide variety of wired and/or wireless computing devices, such as a desktop computer, portable computer, dedicated server computer, multiprocessor computing device, smartphone 109 (FIG. 1A), tablet computing device, and so forth. As shown in FIG. 2, the image editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, user interface component 114, media processor 116) of the image editing system 102 depicted in FIG. 1A. In accordance with such embodiments, the components are stored in memory 214 and executed by the processing device 202. One of ordinary skill in the art will appreciate that the memory 214 can, and typically will, comprise other components which have been omitted for purposes of brevity.

In this regard, the term "executable" may refer to a program file that is in a form that can ultimately be run by the processing device 202. Examples of executable programs may be, for example, a compiled program that can be translated into machine code in a format that can be loaded into a random access portion of the memory 214 and run by the processing device 202, source code that may be expressed in proper format such as object code that is capable of being loaded into a random access portion of the memory 214 and executed by the processing device 202, or source code that may be interpreted by another executable program to generate instructions in a random access portion of the memory 214 to be executed by the processing device 202, etc. An executable program may be stored in any portion or component of the memory 214 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Input/output interfaces 204 provide any number of interfaces for the input and output of data. For example, where the image editing system 102 comprises a personal computer, these components may interface with one or more user input devices via the I/O interfaces 204, where the user input devices may comprise a keyboard 106 (FIG. 1A) or a mouse 108 (FIG. 1A). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image editing system 102 may communicate with one or more computing devices via the network interface 206 over the network 118 (FIG. 1A). The image editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
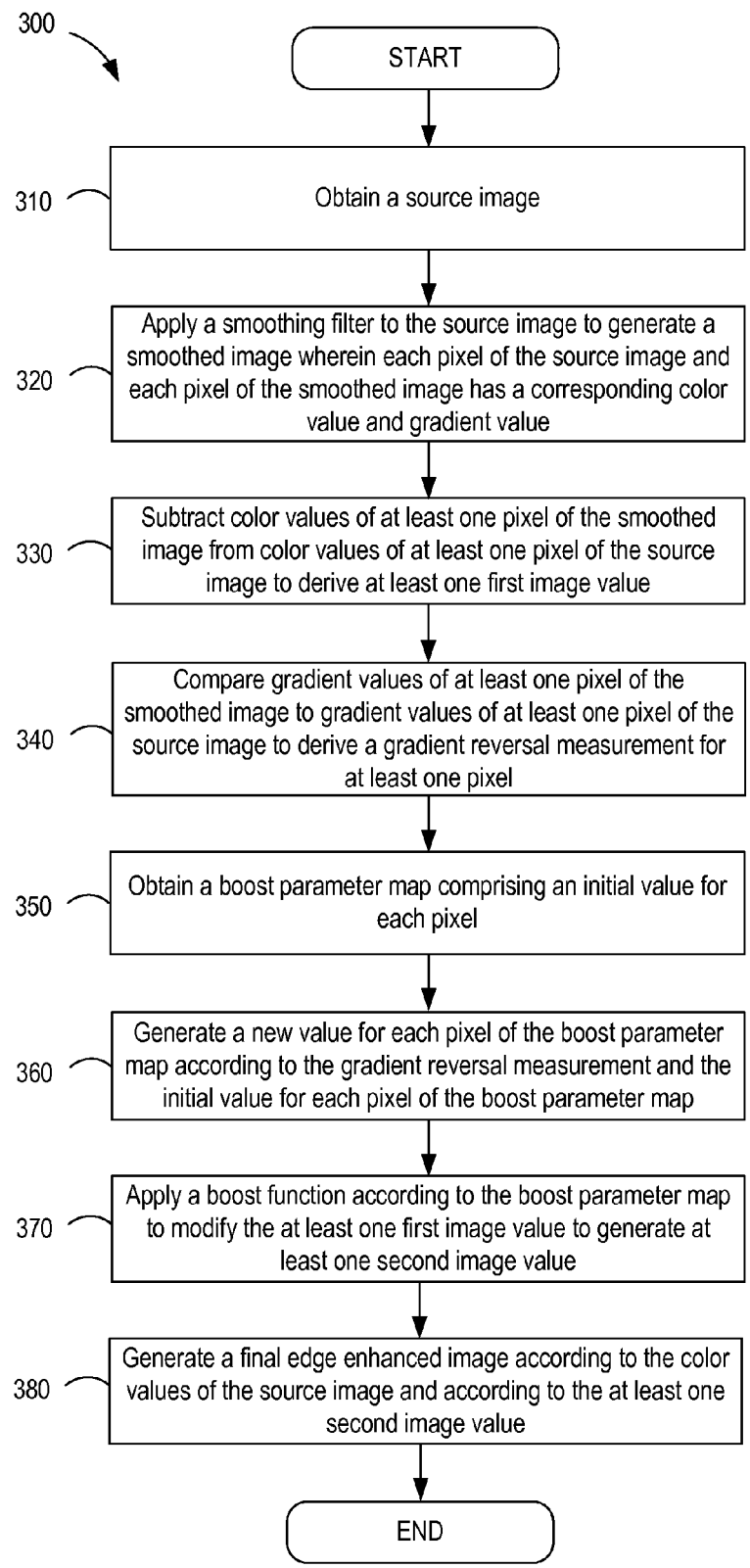
FIG. 3 is a top-level flowchart illustrating examples of functionality implemented as portions of the image editing device of FIG. 1A for facilitating edge enhancement according to various embodiments of the present disclosure.

Reference is made to FIG. 3, which is a flowchart 300 in accordance with one embodiment for facilitating edge enhancement via adaptive generation of a new value of a boost parameter map performed by the image editing system 102 of FIG. 1A. It is understood that the flowchart 300 of FIG. 3 provides merely an example of the many different types of functional arrangements that may be employed to implement the operation of the various components of the image editing system 102 (FIG. 1A). As an alternative, the flowchart of FIG. 3 may be viewed as depicting an example of steps of a method implemented in the image editing system 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Beginning with block 310, a source image 125 (FIG. 1B) to be edited is obtained by the media interface 112 (FIG. 1A).

In block 320, the filter component 126 (FIG. 1B) in the media processor 116 (FIG. 1A) applies a smoothing filter to the source image 125 to generate a smoothed image wherein each pixel of the source image 125 and each pixel of the smoothed image has a corresponding color value and gradient value.

In block 330, a subtractor in the arithmetic operator unit 142 (FIG. 1B) subtracts color values of at least one pixel of the smoothed image from color values of at least one pixel of the source image to derive at least one first image value.

In block 340, the gradient reversal analyzer 128 (FIG. 1B) compares gradient values of at least one pixel of the smoothed image to gradient values of at least one pixel of the source image to derive a gradient reversal measurement for at least one pixel.

In block 350, a boost parameter map comprising an initial value is obtained for each pixel.

In block 360, the boost controller 130 (FIG. 1B) generates a new value for each pixel of the boost parameter map according to the gradient reversal measurement and the initial value for each pixel in the boost parameter map.

In block 370, the boost controller 130 applies a boost function according to the boost parameter map to modify the at least one first image value to generate at least one second image value. Note that in some cases, generation of a new value for each pixel of the boost parameter map is not required.

In block 380, a resultant image 155 comprising a final edge enhanced image is generated according to the color values of the source image 125 and according to the at least one second image value.

Figure 4:
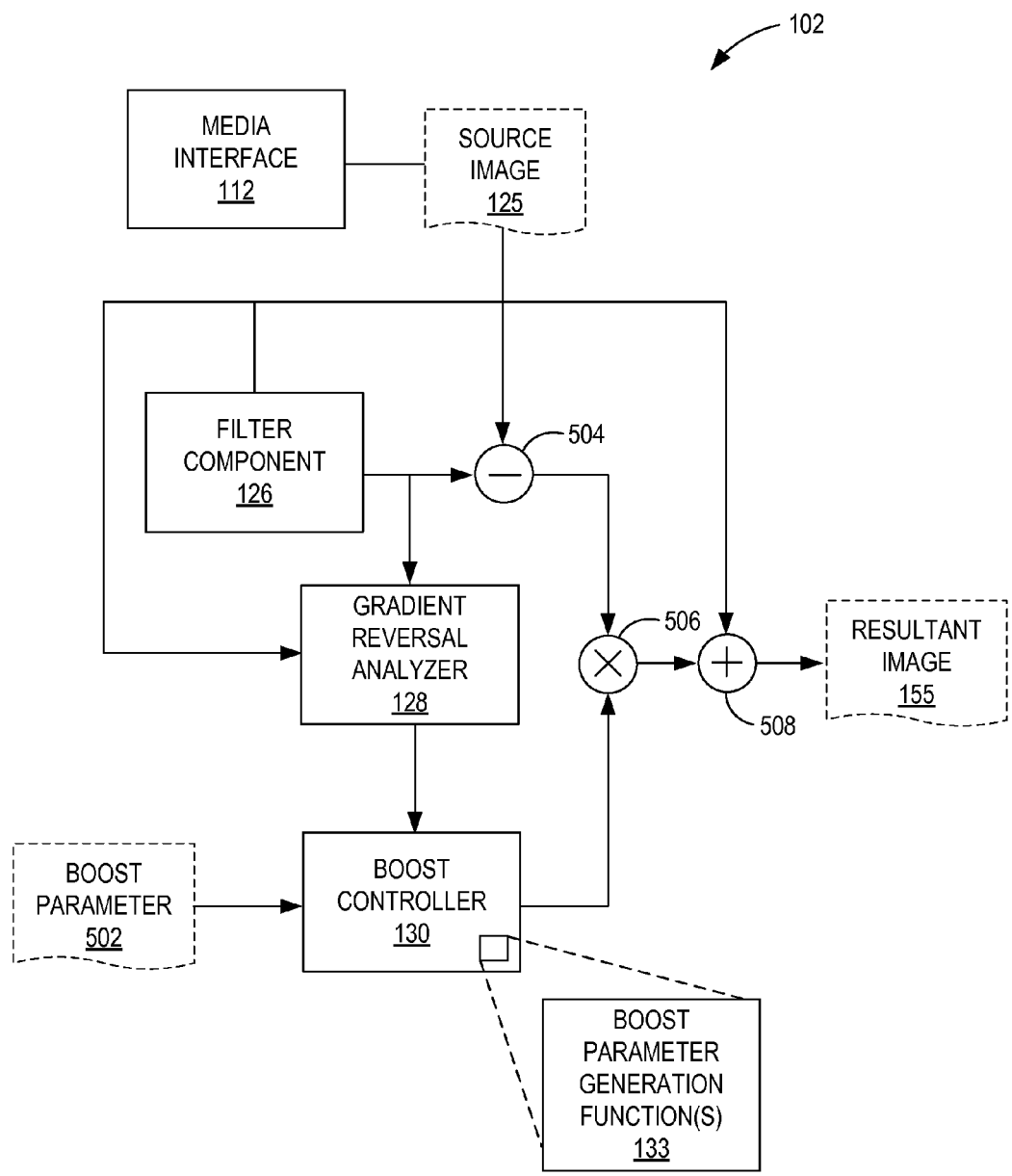
FIG. 4 illustrates the signal flow between the various components of the image editing system.

To further illustrate the edge enhancement techniques disclosed, reference is made to FIG. 4, which illustrates the signal flow between the various components of the image editing system 102. The media interface 112 obtains a source image 125 to undergo edge enhancement in accordance with various embodiments. The source image 125 is forwarded to the filter component 126, which applies a smoothing filter to reduce noise while maintaining strong/sharp edges within the source image 125.

As described earlier, the application of such filtering as bilateral filtering may introduce an unwanted artifact into the image. Thus, in accordance with various embodiments, a gradient reversal analyzer 128 is implemented in conjunction with a boost controller 130 for adaptively generating a new value for each pixel of the boost parameter map used in the boost function. As shown, the gradient reversal analyzer 128 receives both the original source image 125 as well as the smoothed image output by the filter component 126 and analyzes the gradient values in both images.

For some embodiments, the gradient reversal analyzer 128 performs a pixel-level comparison between the two images and determines if the gradient value of a pixel in the smoothed image is larger than the gradient value of the corresponding pixel in the original source image 125. The results of the comparison may be represented by a gradient reversal measurement. Furthermore, this comparison is performed across all the pixels in the images. As shown in FIG. 4, the boost controller 130 may select one or more boost parameter map generation functions 133 to be applied in adaptively generating a new value for each pixel of the boost parameter map according to the gradient reversal measurement and the initial value of each pixel of the boost parameter map 502. Below, various techniques are disclosed for adaptively generating a new value for each pixel of the boost parameter map 502.

If the gradient value is larger or more pronounced in the smoothed image, the boost controller 130 may be configured to attenuate the boost parameter map 502 to derive a new boost parameter map for the pixel. For example, for a pixel located at (i, j), a new value for each pixel of the boost parameter map 502 may be generated by an attenuation factor as follows:

$$\text{new boost parameter}_{i,j} = \text{attenuation factor} * \text{boost parameter}_{i,j}.$$

The expression above is applied if the gradient value is larger or more pronounced in the smoothed image. The boost parameter map 502 represents a base number value for controlling a relative strength for applying a boost function to sharpen an image. For some embodiments, the attenuation factor above is derived based on a ratio of the gradient value of the smoothed image to the gradient value of the source image. On the other hand, if the gradient value is not larger or more pronounced in the smoothed image, then the boost parameter map 502 remains unchanged.

For other embodiments, the boost controller 130 may generate a new value for each pixel of the boost parameter map 502 on a pixel-by-pixel basis based on a ratio of gradient values in the smoothed image output by the filter component 126 and the source image 125 as shown below:

$$\text{new boost parameter}_{i,j} =$$
$$\min\left(1.0, \frac{\text{gradient value in source image}_{i,j}}{\text{gradient value in smoothed image}_{i,j}} * \text{boost parameter}\right)$$

For other embodiments, the boost controller 130 may generate the new value for each pixel of the boost parameter map 502 on a pixel-by-pixel basis based on the following expression:

$$\text{new boost parameter}_{i,j} =$$
$$\min\left(1.0, \left(k * \frac{\text{gradient value in source image}_{i,j}}{\text{gradient value in smoothed image}_{i,j}} + c\right) * \text{boost parameter}\right)$$

In the expression above, the variables k and c are predefined constants. For other embodiments, the new value for each pixel of a boost parameter map 502 is generated by reducing the boost parameter map 502 to a fraction of the initial value according to the difference between the gradient value of the smoothed image and the gradient value of the source image. In the expressions above, the parameters c and K are constants.

The new value for each pixel of the boost parameter map 502 may also be generated by limiting the new value for each pixel of the boost parameter map to a predefined value when the gradient value of the smoothed image being larger than the gradient value of the source image. That is, if (gradient value of the smoothed image i,j)>(gradient value of the source image i,j) and (initial boost parameter map)>(limited boost parameter map), then set (new boost parameter map i, j)=(limited boost parameter map)).

The new value for each pixel of the boost parameter map 502 may also be generated by multiplying the new value for each pixel of the boost parameter map 502 by a predefined negative value when the gradient value of the smoothed image is larger than the gradient value of the source image. That is, if (gradient value of the smoothed image i,j)>(gradient value of the source image i,j), then set (new boost parameter map i, j)=(−1)×(initial boost parameter map)). For some embodiments, the initial value of each pixel of the boost parameter map 502 may be specified by the user via a user interface 165 (FIG. 1B) rendered for display by the user interface component 114 (FIG. 1B), while for other embodiments, the initial value of each pixel of the boost parameter map 502 may be set to a predetermined value.

With reference back to the signal flow diagram in FIG. 4, the smoothed image output by the filter component 126 is subtracted from the source image 125 using the subtractor 504 in the arithmetic operator unit 142 to generate a first image at the output of the subtractor 504. The modified boost parameter map is utilized in a boost function and applied to this first edge enhanced image via the multiplier 506 to produce a second image. Specifically, the boost function is applied according to the boost parameter map to modify first image values to generate second image values.

For some embodiments, values of the first image (e.g., pixel attributes such as a color value) are multiplied by the boost parameter map to generate values of the second image. A final resultant image 155 is generated by the adder 508 by adding the values of the source image 125 to the values of the second image output by the multiplier 506. For some embodiments, the operations performed by the arithmetic operator unit 142 are performed on a pixel-by-pixel basis.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for performing edge enhancement on a source image in an image editing device, comprising:
    applying a smoothing filter to the source image to generate a smoothed image wherein each pixel of the source image and each pixel of the smoothed image has a corresponding color value and gradient value;
    subtracting color values of at least one pixel of the smoothed image from color values of at least one pixel of the source image to derive at least one first image value;
    comparing a gradient value of at least one pixel of the smoothed image to a gradient value of the corresponding pixel of the source image to derive a gradient reversal measurement for at least one pixel, wherein the gradient value of the at least one pixel of the smoothed image is calculated based on a difference in color values of neighboring pixels of the at least one pixel;
    obtaining a boost parameter map comprising an initial value for each pixel;
    generating a new value for each pixel of the boost parameter map according to the gradient reversal measurement and the initial value of each pixel of the boost parameter map;
    applying a boost function according to the boost parameter map to modify the at least one first image value to generate at least one second image value; and
    generating a final edge enhanced image according to the color values of the source image and according to the at least one second image value.

2. The method of claim 1, wherein the smoothing filter is a low pass filter configured to filter high spatial frequency components of the source image.

3. The method of claim 2, wherein the smoothing filter comprises a bilateral filter.

4. The method of claim 1, wherein generating the new value for each pixel of the boost parameter map is performed on a pixel-by-pixel basis.

5. The method of claim 4, further comprising obtaining the initial value of each pixel of the boost parameter map from a user of the image editing system.

6. The method of claim 4, wherein the initial value of each pixel of the boost parameter map comprises a predefined value.

7. The method of claim 1, further comprising determining, on a pixel-by-pixel basis, the gradient value of at least one pixel of the source image and the smoothed image by subtracting color values of neighboring pixels prior to comparing the gradient value of at least one pixel of the smoothed image to the gradient value of at least one pixel of the source image.

8. The method of claim 1, wherein generating the new value for each pixel of the boost parameter map comprises setting the new value for each pixel of the boost parameter map to a fraction of the initial value in response to the gradient value of the at least one pixel of the smoothed image being larger than the gradient value of at least one pixel of the source image.

9. The method of claim 1, wherein generating the new value for each pixel of the boost parameter map comprises setting the new value for each pixel of the boost parameter map to a fraction of the initial value according to a ratio of the gradient value of the at least one pixel of the source image and the gradient value of the at least one pixel of the smoothed image.

10. The method of claim 1, wherein generating the new value for each pixel of the boost parameter map comprises setting the value of the boost parameter map to a fraction of the initial value according to the formula:

$$\text{new boost parameter}_{i,j} = \min\left(1.0, \left(k * \frac{\text{gradient value in source image}_{i,j}}{\text{gradient value in filtered image}_{i,j}} + c\right) * \text{boost parameter}\right)$$

wherein k and c are predefined constants.

11. The method of claim 1, wherein generating the new value for each pixel of the boost parameter map comprises setting the new value for each pixel of the boost parameter map to a fraction of the initial value according to a difference between the gradient value of at least one pixel of the smoothed image and the gradient value of at least one pixel of the source image.

12. The method of claim 1, wherein generating the new value for each pixel of the boost parameter map comprises limiting the new value for each pixel of the boost parameter map to a predefined value when the gradient value of at least one pixel of the smoothed image is larger than the gradient value of at least one pixel of the source image.

13. The method of claim 1, wherein generating the new value for each pixel of the boost parameter map comprises deriving the new value for each pixel of the boost parameter map by multiplying the initial value by a predefined negative value when the gradient value of at least one pixel of the smoothed image is larger than the gradient value of at least one pixel of the source image.

14. The method of claim 1, wherein the boost function corresponds to an edge sharpening function for boosting contrast between higher spatial frequency components and lower spatial frequency components in the source image.

15. The method of claim 1, wherein applying the boost function according to the boost parameter map to modify the at least one first image value to generate the at least one second image value comprises multiplying the at least one first image value by the boost parameter map to produce the at least one second image value.

16. The method of claim 1, wherein generating the final edge enhanced image according to the source image and the at least one second image value is performed by adding color values of the source image to the at least one second image value.

17. A system for editing a digital image, comprising:
a computing device including a processor, the computing device comprising an application executable by the computing device, the application comprising:
a low pass filter configured to receive a source image and filter high spatial frequency components of the source image to generate a smoothed image;
an arithmetic operator unit configured to subtract color values of the smoothed image from color values of the source image to produce a first image value on pixel-by-pixel basis;
a gradient reversal analyzer configured to compare gradient values of the smoothed image to gradient values of the source image and generate a control signal, wherein the gradient reversal analyzer is further configured to determine, on a pixel-by-pixel basis, the gradient values of the source image and the smoothed image by subtracting color values of neighboring pixels before the comparing step; and
a boost controller configured to generate a new value for each pixel of a boost parameter map according to the control signal, wherein the boost controller is further configured to apply a boost function according to the boost parameter map to modify the first image value to generate a second image value, and wherein the arithmetic operator unit is further configured to generate an edge enhanced image according to color values of the source image and the second image value.

18. The system of claim 17, wherein the boost controller generates the new value for each pixel of the boost parameter map on a pixel-by-pixel basis according to the control signal.

19. The system of claim 17, the application further comprising a user interface component configured to obtain the initial value of each pixel of the boost parameter map from a user.

20. The system of claim 17, wherein the initial value of each pixel of the boost parameter map comprises a predefined value.

21. The system of claim 17, wherein the boost controller is configured to generate the new value for each pixel of the boost parameter map according to the comparison of gradient values according to a relationship between respective gradient values in the smoothed image and the source image.

22. The system of claim 21, wherein the boost controller is configured to generate the new value for each pixel of the boost parameter map according to the comparison of gradient values by reducing the boost parameter map to a fraction of the initial value in response to the gradient value of the smoothed image being larger than the gradient value of the source image.

23. The system of claim 17, wherein the boost function corresponds to an edge sharpening function for boosting contrast between higher spatial frequency components and lower spatial frequency components in the source image.

24. The system of claim 17, wherein the boost function further comprises:
a multiplier for multiplying the first image value by the boost parameter map to produce the second image value; and
an adder for adding the color values of the source image to the second image value to generate a final edge enhanced image.

25. A non-transitory computer-readable medium embodying a program executable in a computing device, comprising:
code that removes high spatial frequency components from the source image to generate a smoothed image;
code that derives a first image value based on the smoothed image and the source image;
code that compares gradient values of the smoothed image to gradient values of the source image, wherein the gradient values are calculated based on a difference in color values of neighboring pixels;

code that generates a new value for each pixel of a boost parameter map according to the comparison of gradient values and an initial value of each pixel of the boost parameter map;

code that applies a boost function according to the boost parameter map to modify the first image value to generate a second image value; and code that adds the second image value to color values of the source image to generate a final edge enhanced image.

26. The non-transitory computer-readable medium of claim 25, wherein generating the new value for each pixel of the boost parameter map according to the comparison of gradient values and the initial value of each pixel of the boost parameter map comprises reducing the initial value of each pixel of the boost parameter map in response to the gradient value of the smoothed image being greater than a gradient reversal value of the source image.

* * * * *